Dec. 23, 1969    JOSEPH CHAK-FAI CHIU    3,485,519
READILY DEMOUNTABLE CONSTRUCTIONAL UNIT
Filed Oct. 25, 1967    5 Sheets-Sheet 1

Inventor
Joseph Chak-Fai Chiu
By Cushman, Darby, Cushman
Attorneys

Dec. 23, 1969   JOSEPH CHAK-FAI CHIU   3,485,519
READILY DEMOUNTABLE CONSTRUCTIONAL UNIT
Filed Oct. 25, 1967   5 Sheets-Sheet 2
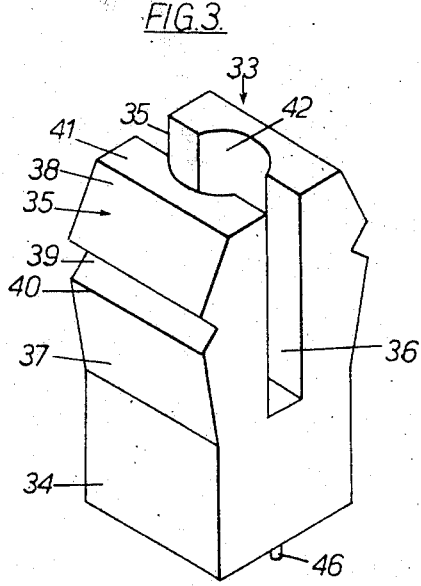
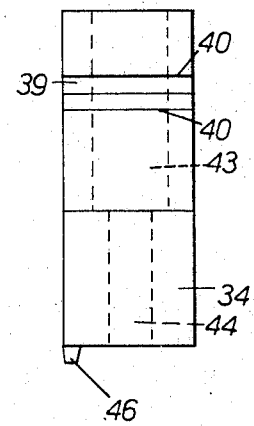
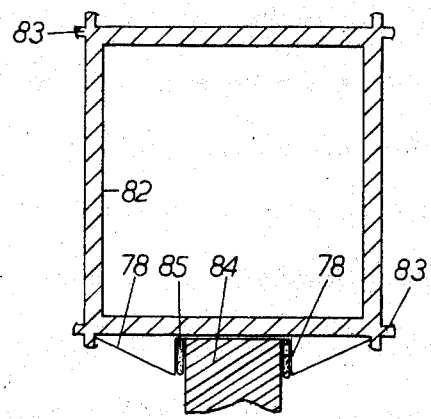
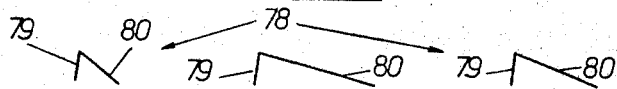
Inventor
Joseph Chak-Fai Chiu
By Cushman, Darby & Cushman
Attorneys

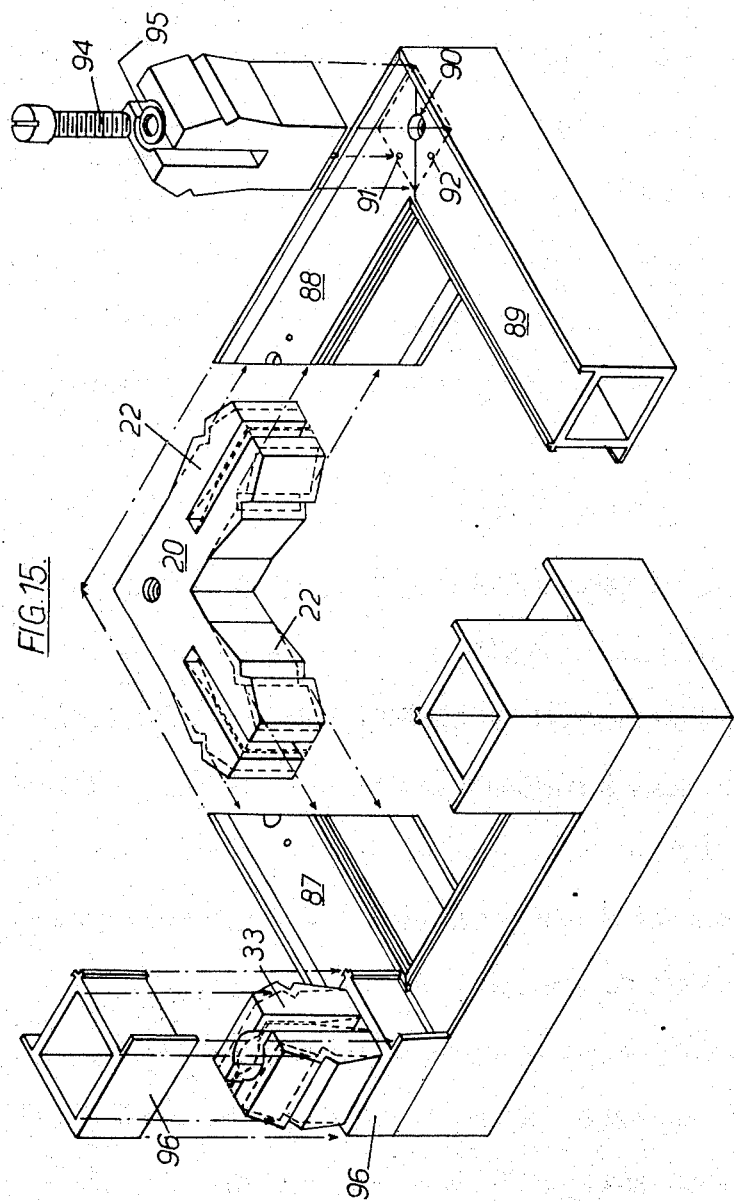

Dec. 23, 1969  JOSEPH CHAK-FAI CHIU  3,485,519
READILY DEMOUNTABLE CONSTRUCTIONAL UNIT
Filed Oct. 25, 1967                    5 Sheets-Sheet 5

Inventor
Joseph Chak-Fai Chiu
By
Cushman, Darby & Cushman
Attorneys

United States Patent Office 3,485,519
Patented Dec. 23, 1969

3,485,519
READILY DEMOUNTABLE CONSTRUCTIONAL UNIT
Joseph Chak-Fai Chiu, 748A Nathan Road, Rm. 1012, Kowloon, Hong Kong
Filed Oct. 25, 1967, Ser. No. 677,962
Claims priority, application Great Britain, July 24, 1967, 33,876/67
Int. Cl. F16b 7/00
U.S. Cl. 287—54
2 Claims

ABSTRACT OF THE DISCLOSURE

A constructional unit for connecting together hollow tubes includes a connecting member having a base portion and at least two insert portions which are at an angle to each other.

---

This invention concerns a readily demountable constructional unit.

According to one aspect of the invention, there is provided a readily demountable constructidnal unit comprising three hollow tubes, a first connecting member connecting two of said hollow tubes together and comprising a base portion having a bore therein, two mutually perpendicular insert portions made of a resiliently flexible material and secured to said base portion, a second connecting member connecting together said first connecting member and the third of said hollow tubes, said second connecting member comprising a base portion and an insert portion secured to said base portion, each said insert portion including two substantially parallel spaced apart prongs which define a substantially axially extending slit therebetween, the base portion of said second connecting member being formed with a substantially axial bore, each said insert portion being shaped so as to flare outwardly from the said base portion to its maximum external cross-section and then to taper inwardly, said maximum cross-section being somewhat larger than the internal cross-section of the said hollow tubes, the insert portions being inserted into their respective tubes by compressing the prongs together, the said maximum cross-section being defined by the edge of a substantially V-shaped groove formed in each said prong to extend normally to the longitudinal axis of the respective prong, the said first and second connecting members being secured together by a fastener member passed through the respective bores in the said members, whereby to form a structure of three mutually perpendicular tubes.

Preferably the said base portion and the said insert portions are formed of nylon.

According to another aspect of the invention, there is provided a readily demountable constructional unit comprising three hollow tubes, a first connecting member connecting two of said hollow tubes together and comprising a base portion, two mutually perpendicular insert portions made of a resiliently flexible material and secured to said base portion, a second connecting member connecting together said first connecting member and the third of said hollow tubes, said second connecting member comprising a base portion and an insert portion secured to said base portion, each said insert portion including two substantially parallel spaced apart prongs which define a substantially axially extending slit therebetween, the base portion of said second connecting member being formed with a substantially axial bore, each said insert portion being shaped so as to flare outwardly from the said base portion to its maximum external cross-section and then tapering inwardly, said maximum cross-section being somewhat larger than the internal cross-section of the said hollow tubes, the insert portions being inserted into their respective tubes by compressing the prongs together, the said maximum cross-section being defined by the edges of a substantially V-shaped groove formed in each said prong to extend normally to the longitudinal axis of the respective prong, the said first and second connecting members being secured together by a fastener member passed through the said bore and a bore defined in one of said two tubes connected together by the first connecting member, whereby to form a structure having three mutually pependicular tubes.

The invention is illustrated, merely by way of example, with reference to the accompanying drawings, in which:

FIGURE 3 is a perspective view of a further connecting member for use in combination with the connecting member of FIGURE 1;

FIGURE 4 is a side view of the further connecting member of FIGURE 3;

FIGURES 5 to 13 show a plurality of cross-sectional shapes of tubes for use with the connecting member to form a constructional unit;

FIGURES 5, 7 and 13 show how a plate-like member may be secured to the tubes;

FIGURE 14 shows, in cross-section, glazing beads for use in securing a plate-like member to the tubes as shown in FIGURES 7 and 13;

FIGURE 15 is a general perspective view of a constructional unit according to the present invention, and FIGURES 17(a)–(c) show the steps of joining two hollow tubes by means of the further connecting member of the present invention.

Figure 1:
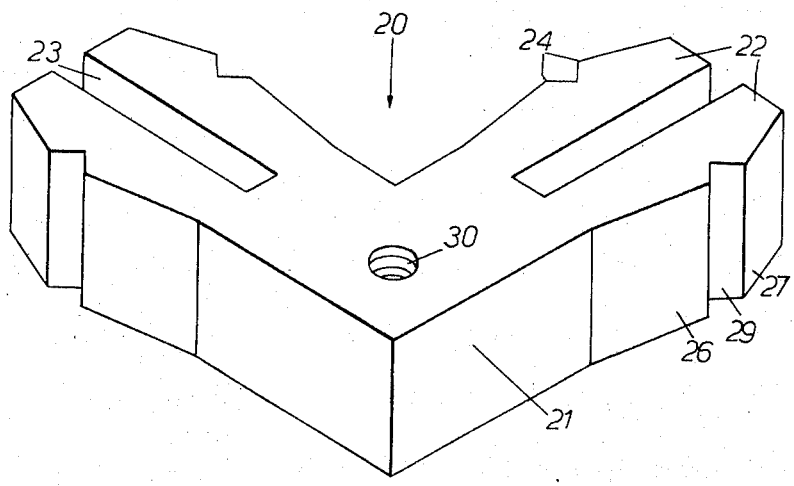
FIGURE 1 is a perspective view of a connecting member in accordance with the present invention.
Figure 2:
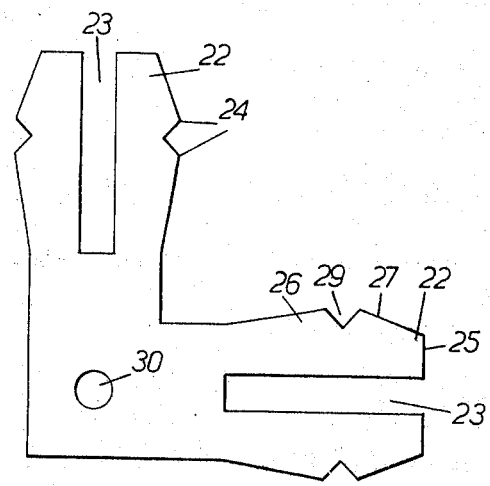
FIGURE 2 is a side elevation of the connecting member of FIGURE 1.

Referring first to FIGURES 1 and 2, there is shown a connecting member 20 comprising a base portion 21 and two integral and similar insert portions each having two substantially parallel prongs 22.

The prongs 22 are spaced from each other by a substantially axially extending slit 23. The faces of the prongs 22 remote from the slit 23 comprise an outwardly flaring part 26, which is nearest to the base portion 21, and an inwardly tapering end part 27. Between the flaring and tapering parts 26, 27 a transverse groove 29 is provided which is of V-shaped cross-section. The top edges 24 of the groove 29 constitute the locations of maximum external cross-section of the prongs 22.

The end faces 25 of the prongs 22 are flat and rectangular, whereby the prongs 22 are insertable into a hollow tube of rectangular cross-section. The connecting member 20 is made of a resiliently flexible material, which is preferably a synthetic resin material, e.g. nylon. It will be clear, therefore, that on compressing the two adjacent parallel prongs 22, the slit 23 becomes narrower, and the external cross-section of the insert portion is reduced, thereby enabling the insertion of the prongs 22 into a hollow tube the internal cross-section of which is somewhat smaller than the maximum external cross-section of the member 20 when in the normal state.

In one embodiment, the flaring part 26 diverges from the longitudinal axis of the insert portion at 12°, whereas the tapering part 27 converges thereto at 20°. The two sides of the groove 29 are then at 90°.

For reasons explained below, a transverse bore 30 is provided at or adjacent the centre of the base portion 21.

On FIGURES 1 and 2, two insert portions are shown at a right angle to each other. However, the included angle could be less or greater than 90°, and in particular, it could be 180°. Moreover, instead of two insert portions, there would be provided three such portions, e.g. mutually perpendicular to each other, or even as many as six portions, e.g. mutually perpendicular to each other.

Referring now to FIGURES 3 and 4, there is shown a further connecting member 33 for use in combination with the connecting member 20 of FIGURES 1 and 2.

It will be seen that the further connecting member 33 is generally similar to the said member 20, but it comprises one insert portion only integrally formed with a base portion 34. The insert portion comprises two prongs 35 separated by a substantially axial slit 36. Each prong 35 has an outwardly flaring part 37 and an inwardly flaring end part 38 separated by a substantially V-shaped transverse groove 39. The top edges 40 of the groove 39 constitute the location of maximum external cross-section of the further connecting member 33.

The end faces 41 of the prongs 35 are flat and substantially rectangular, but with a part-circular cut-away groove 42, whereby the two grooves 42 and the slit 36 form an axial bore 43. This bore 43 terminates at the base portion 34, but communicates with a coaxial bore 44 extending axially through the base portion 34. As can be seen from FIGURE 4, the diameter of bore 44 is smaller than that of bore 43.

The bottom face of the base portion 34, as seen on the drawings, is substantially flat and of rectangular cross-section, but it is formed with an integral substantially cylindrical projection 46 adapted to be used as a key for a purpose to be described below. The key 46 is, of course, eccentric of the central bore 44 and is preferably located at the middle of one of the rectangular sides of the said bottom face.

The further connecting member 33 is also made of a resiliently flexible material, e.g. nylon. Thus, on compressing the prongs 35 towards each other, the slit 36 becomes narrower, and the prongs 35 can then be inserted into a hollow tube the internal cross-section of which is smaller than the largest external cross-section of the member 33 in its normal, uncompressed state.

The inclinations of the flaring and tapering parts to the longitudinal axis of the insert portion, and the included angle between the sides of the groove 39 are substantially the same as for the corresponding parts 26, 27 and 29 respectively in the FIGURE 1 embodiment.

In an embodiment not shown, instead of V-shaped grooves 29, 39 the members 20, 33 could be formed with one or more transverse ribs at the junction of the flaring and tapering parts 26, 27 or 37, 38 respectively, the rib or ribs then constituting the location of maximum external cross-section of the members 20 or 33.

Referring now to FIGURES 5 to 13, a plurality of tubes is shown in cross-section, the tubes being for use in a constructional unit incorporating connecting members 20 and 33. As can be seen, all the tubes are of square internal cross-section, although, of course, the cross-sections could have other rectangular shapes, if so desired. Moreover, the cross-sections could be circular. It will be appreciated that in these cases the external shapes of the connecting members 20 and 33 would also have to be modified appropriately.

Figure 5:
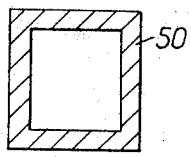
Figure 6:
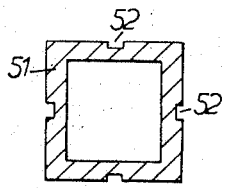

FIGURE 5 shows a plain tube 50 of square cross-section; FIGURE 6 shows a tube 51 of square cross-section in which grooves 52 have been milled or otherwise formed on the external faces thereof. The grooves 52 are of a rectangular U-section and are located at the middle of said faces. The grooves 52 are adapted to receive plate-like members for constructing a unit comprising e.g. tubes and glass plates for furniture. Of course, not all four sides of the tube 51 need have a groove 52.

Figure 7:
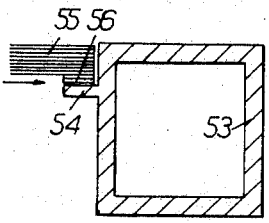

FIGURE 7 shows a tube 53 having a flange 54 extending normal to one side thereof and off-set from the centre. The flange 54 preferably extends along the full axial length of the tube 53. The flange 54 is adapted to engage and locate a plate-like member 55 to be secured to the tube 53. Preferably, when the plate-like member 55 is fragile, e.g. a glass plate, a resilient seal tape 56 is secured, e.g. by glueing, to the flange 54. The seal tape 56 serves as a cushion as well as a seal, and reduces friction.

Figure 8:
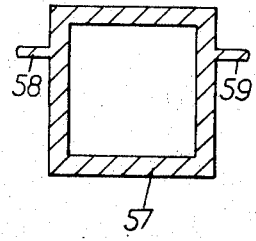

FIGURE 8 shows a tube 57 essentially similar to that of FIGURE 7 but which has two flanges 58, 59.

Figure 9:
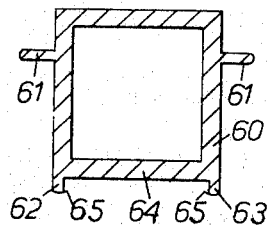

FIGURE 9 shows a tube 60 which, in addition to flanges 61 similar to the flange 54 of FIGURE 7, has two additional flanges 62, 63. The flanges 62, 63 are substantially parallel with each other, are normal to a face 64 of the tube 60, are of equal length, and terminate in inwardly directed hooks 65, the purpose of which will be explained below.

Figure 10:
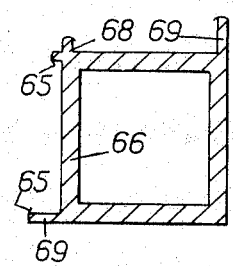
Figure 11:
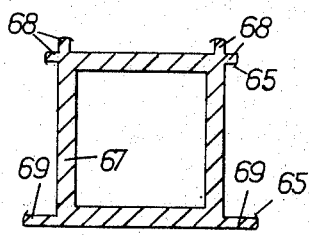

FIGURES 10 and 11 are substantially similar to FIGURE 9 and show, respectively, tubes 66 and 67 having a plurality of flanges 68, 69 each of which terminates in inwardly turned hooks 65. However, the hooks 68, 69 are of unequal length. As will be seen, certain faces of the tubes 66, 67 have a flange 68 at one end facing a flange 69 at the opposite end, whereas other faces have two similar flanges 68 facing each other.

Figure 12:
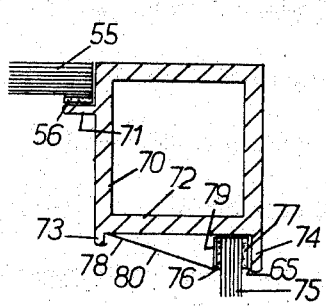

FIGURE 12 shows yet another tube 70 which has a flange 71 of the type shown at 54 on FIGURE 7. In addition, one face 72 of tube 70 has flanges 73, 74 of unequal length similar to flanges 68, 69 of FIGURES 10 and 11.

FIGURE 12 illustrates how a plate 75, e.g. of glass, may be secured to the tube 70. The inwardly facing axial face of the flange 74 has secured thereto a length of seal tape 77 which is engaged and retained by the hook 65. Next, the plate 75 is placed next to the flange 74 and is pressed against it by a glazing bead 78. A number of beads 78 are shown in cross-section in FIGURE 14, from which it will be seen that the beads 78 are of an open channel section with one side 79 much shorter than the other side 80. The side 79 is adapted to bear against the plate 75, with the interposition of a further length of seal tape 76, while the longer side 80 hooks under the flange 73. The bead 78 thus acts as a resilient clip and is adapted to be pressed into position. The seal tape 76 may be secured, e.g. by glueing, to the shorter side 79 of bead 78, or it may be secured to the plate 75.

FIGURE 13 shows a tube 82 having flanges 83 of the type shown at 68 in FIGURES 10 and 11. To mount a plate-like member 84, e.g. of plywood, at the centre of one face of the tube 82, rather than abuttingly against one of said flanges, two glazing beads 78 are used, which are arranged to bear against the plate 84 from opposite sides, with the interposition of seal tapes 85.

FIGURE 15 shows, in general perspective, a constructional assembly or unit employing tubes of the kind described with reference to FIGURES 5 to 13, and connecting members 20 and 33 described with reference to FIGURES 1 to 4. At the top centre of the drawing, there is shown a connecting member 20 about to be inserted into two hollow tubes 87, 88 to make a right-angled corner joint. Dotted lines show the positions of the prongs 22 when they are compressed prior to insertion. It will be appreciated that after insertion of the member 20 into the tubes 87, 88, the resilience of the member 20 will cause the prongs 22 frictionally to engage the internal surfaces of the tubes. The edges 24 of the groove 29 serve to enhance this effect.

In all the embodiments of this invention, the tubes are preferably aluminum tubes.

To make a three-dimensional joint using connecting members 20, 33, the following procedure is adopted. Two tubes 88, 89, shown at the right-hand side of FIGURE 15, are formed with a 45° diagonal cut and are connected together by a member 20. Along the diagonal joining line of the two tubes, a screw hole or bore 90 is formed which is arranged to be in alignment with the bore 30 in member 20. Furthermore, each of the tubes 88, 89 is provided with a key-hole 91, 92 respectively, which is adapted to co-operate with key 46 on the further connecting member 33. A further connecting member 33 is then placed on the tubes 88, 89 in such a way that its bores 44, 45 are in alignment with bore 30 and screw hole 90. The key 46 will then be received in one of the key-holes 91 or 92, depending on the orientation of the further connecting member 33.

Chain-dotted lines indicate the final position of the member 33 in which position it is secured by means of a screw 94 and washer 95, the screw 94 extending through bores 45, 44, 90 and 30.

The next step of the assembly of the constructional unit is shown at the left-hand side of FIGURE 15. Having secured the further connecting member 33 in position, a further tube 96 may be joined up to the construction by compressing the prongs 35 of the member 33, as shown in dotted lines, thereby enabling tube 96 to fit over the member 33. The change from the initial to the final position of tube 96 is shown in chain-dotted lines. At the bottom centre part of FIGURE 15, a completed three-dimensional joint is shown in which the vertically extending tube 97 is similar to the tube 96, but is of greater length, thereby concealing the member 33.

Figure 16A:
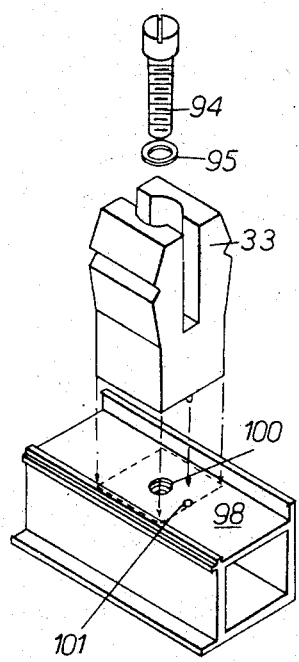
Figure 16B:
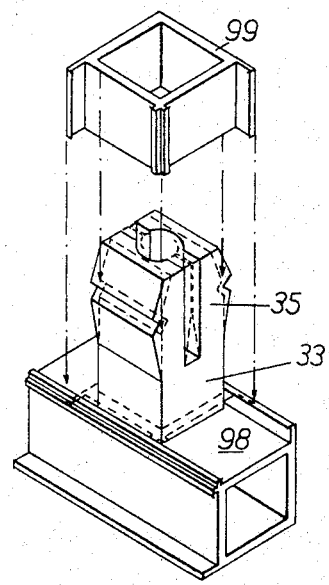
Figure 16C:
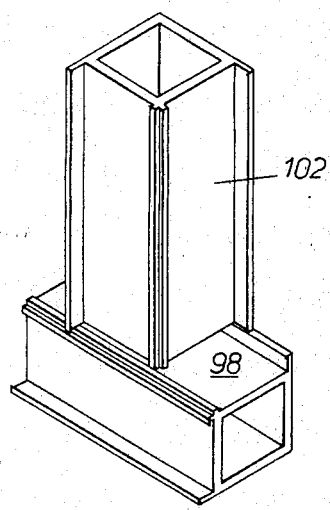

FIGURES 16(a)–(c) show the stages of joining together two tubes 98, 99 substantially at right angle with the help of a further connecting member 33. In this arrangement the joint need not be made at the end of the tube 98, but can be made anywhere along its length by forming an appropriate screw hole 100 and a key-hole 101. Again, chain-dotted lines indicate the final position of member 33 on FIGURE 16(a), and the final position of tube 99 on FIGURE 16(b). On FIGURE 16(c), tube 99 has been replaced by a longer tube 102 of similar cross-section so as to conceal the joint. On FIGURE 16(b) dotted lines indicate the positions of the prongs 35, when compressed.

Once the assembly has been erected in the manner described with reference to FIGURES 15 and 16, this will serve as a framework to which plate-like members can be secured with the help of glazing beads 78 in the manner shown on FIGURES 12 and 13.

It will be appreciated that the present invention provides a connecting member for connecting together hollow tubes, and a constructional unit or assembly, which is of use in architectural designs generally. It can be used for erecting partitions, for furniture assembly and other fields in interior decorating. The invention provides a construction which is light yet rigid, of pleasng appearance and relatvely easy to assemble and dismantle.

I claim:
1. A readily demountable constructional unit comprising three hollow tubes, a first connecting member connecting two of said hollow tubes together and comprising a base portion having a bore therein, two mutually perpendicular insert portions made of a resiliently flexible material and secured to said base portion, a second connecting member connecting together said first connecting member and the third of said hollow tubes, said second connecting member comprising a base portion and an insert portion secured to said base portion, each said insert portion incluidng two substantially parallel spaced apart prongs which define a substantially axially extending slit therebetween, the base portion of said second connecting member being formed with a substantially axial bore, each said insert portions being shaped so as to flare outwardly from the said base portion to the maximum external cross-section of said insert portion and then to taper inwardly, said maximum cross-section being somewhat larger than the internal cross-section of the said hollow tubes, the insert portions being inserted into their respective tubes by compressing the prongs together, the said maximum cross-section being defined by the edges of a substantially V-shaped groove formed in each said prong to extend normally to the longitudinal axis of the respective prong, the said first and second connecting members being secured together by a fastener member passed through the respective bores in the said members whereby to form a structure of three mutually perpendicular tubes.

2. A readily demountable constructional unit comprising three hollow tubes, a first connecting member connecting two of said hollow tubes together and comprising a base portion, two mutually perpendicular insert portions made of a resiliently flexible material and secured to said base portion, a second connecting member connecting together said first connecting member and the third of said hollow tubes, said second connecting member comprising a base portion and an insert portion secured to said base portion, each said insert portion including two substantially parallel spaced apart prongs which define a substantially axially extending slit therebetween, the base portion of said second connecting member being formed with a substantially axial bore, each said insert portion being shaped so as to flare outwardly from the said base portion to the maximum external cross-section of said insert portion and then tapering inwardly, said maximum cross-section being somewhat larger than the internal cross-section of the said hollow tubes, the insert portions being inserted into their respective tubes by compressing the prongs together, the said maximum cross-section being defined by the edges of a substantially V-shaped groove formed in each said prong to extend normally to the longitudinal axis of the respective prong, the said first and second connecting member being secured together by a fastener member passed through the said bore and a bore defined in one of said two tubes connected together by the first conecting member whereby to form a structure having three mutually perpendicular tubes.

References Cited

UNITED STATES PATENTS

| 2,996,159 | 8/1961 | Casebolt | 287—189.36 |
| 2,926,941 | 3/1960 | Thompson | 46—29 |
| 3,299,596 | 1/1967 | Neal | 52—716 |
| 3,303,581 | 2/1967 | Levinson | 46—29 |
| 3,314,699 | 4/1967 | Taylor. | |
| 3,344,573 | 10/1967 | Martin | 52—476 |

FOREIGN PATENTS 643,648   2/1964   Belgium.

OTHER REFERENCES

Schuco Aluminum, by Socomatec S.A.R.L., pages 32, 36 and 37.

HENRY C. SUTHERLAND, Primary Examiner

U.S. Cl. X.R.

52—475, 585, 665; 287—189.36